(No Model.)
C. J. GUSTAVESON.
NOSE FEED BAG.
No. 249,927.                     Patented Nov. 22, 1881.
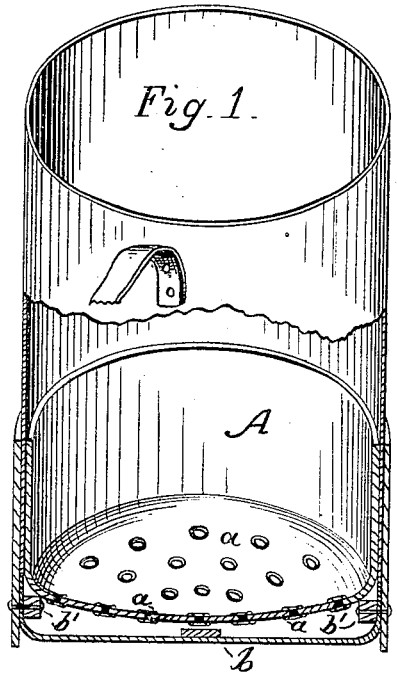
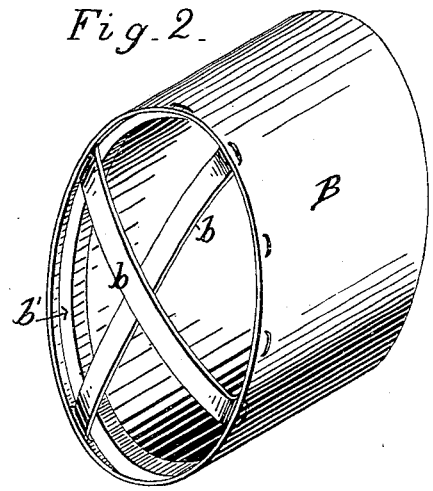
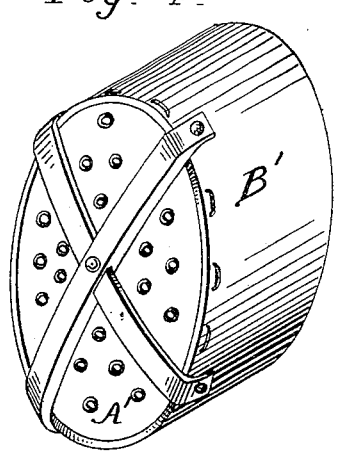
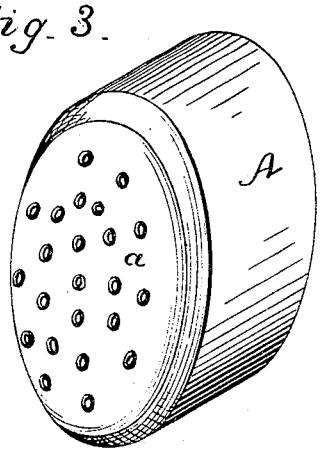
WITNESSES:
Thos. Houghton.
A. G. Syne
INVENTOR:
C. J. Gustaveson
BY
ATTORNEYS.

UNITED STATES PATENT OFFICE.

CHARLES J. GUSTAVESON, OF SALT LAKE CITY, UTAH TERRITORY.

NOSE FEED-BAG.

SPECIFICATION forming part of Letters Patent No. 249,927, dated November 22, 1881.

Application filed May 9, 1881. (No model.)

*To all whom it may concern:*

Be it known that I, CHAS. J. GUSTAVESON, a citizen of the United States, residing at Salt Lake City, in the county of Salt Lake and Territory of Utah, have invented a new and useful Improvement in Nose Feed-Bags for Animals, of which the following is a full, clear, and exact description, reference being had to the drawings hereto annexed.

My invention relates to nose feed-bags which have perforated bottoms; and my improvement consists in certain peculiarities of construction, as hereinafter described.

In the accompanying drawings, Figure 1 represents a nose-bag, partly in section, showing my improvement; Fig. 2, the supporter of the removable bottom detached from the bag; Fig. 3, the removable bottom; and Fig. 4, a modification.

Heretofore I have used a ventilator in the bottom of a nose-bag consisting of a perforated metal plate, as described in Letters Patent No. 240,122, granted to me April 12, 1881. Metal plates, however, are comparatively expensive, and their attachment to the bag a matter of more or less inconvenience.

To provide a cheaper ventilator I construct the entire bottom of the bag of a suitable piece of leather, A, blocked to shape and provided with perforations, in which are secured eyelets $a$, to prevent the same from closing up in case of becoming moist. This perforated bottom is removably inserted into a supporter, B, which is attached on its inner side to the lower part of the bag, and provided with two or more cross-stays, $b$, which are secured by means of rivets or small staples within the lower end thereof, in order to prevent the same from spreading or otherwise losing its shape. A strip of leather, $b'$, is secured to the inside of the supporter in such manner as to serve as a rest for the bottom A, and to prevent it from coming in contact with the cross-stays. In this manner the supporter serves the additional purpose of protecting the bottom from contact with the ground in case the horse should lower his head.

As thus constructed the removable bottom may be taken out at will, and the bag and supporter with its cross-stays used as a muzzle.

A modification of the above is formed by utilizing the scraps of material left after cutting out the blocked bottoms. This consists in the smaller bottom, A', provided with perforations and eyelets, and rigidly secured to a supporter, B', by means of staples driven through the supporter into the periphery of the bottom. Two cross-stays, one passed through a horizontal slit near the center of the other, are secured to the bottom by a rivet, and have their ends turned up and fastened to the outside of the supporter.

This form of my invention may be made not only of flexible material, but also of wood or metal, if desired.

Having thus described my invention, what I claim as new, and desire to secure by Letters Patent, is—

1. In a nose-bag for animals, a perforated bottom, in combination with a supporter having protecting cross-stays, substantially as shown and described.

2. In a nose-bag for animals, a removable bottom, A, blocked to shape, and provided with perforations and eyelets $a$, in combination with a supporter, B, having two or more protecting cross-stays, $b$, and rest $b'$, substantially as shown and described.

3. In a nose-bag for animals, a supporter, B, having two or more cross-stays on the lower end, in combination with a bag, whereby the same may be used either as a feed-bag or a muzzle, as set forth.

4. In a nose-bag for animals, the perforated bottom A', in combination with the supporter B', secured to the periphery thereof, and provided with two protecting cross-stays, one inserted through a slit in the other and riveted to the said bottom, substantially as shown and described.

CHAS. J. GUSTAVESON.

Witnesses:
I. L. GRUNDHAND,
N. C. CHRISTENSEN.